United States Patent [19]

Craemer et al.

[11] 4,415,978

[45] Nov. 15, 1983

[54] CUT-TO-MARK CUT-OFF CONTROL AUTOMATED FOR SPLICE AND ORDER CHANGE

[75] Inventors: Robert H. Craemer, Cherry Hill; A. Brent Woolston, Palmyra, both of N.J.

[73] Assignee: Molins Machine Company, Inc., Cherry Hill, N.J.

[21] Appl. No.: 254,226

[22] Filed: Apr. 14, 1981

[51] Int. Cl.$^{3}$ .......................... B26D 5/36; G06F 15/20

[52] U.S. Cl. .......................................... 364/475; 83/37; 83/74; 83/288; 83/364

[58] Field of Search ..................... 364/471, 475; 83/37, 83/38, 71, 74, 76, 288, 289, 303, 364, 372; 493/35; 271/202

[56] References Cited

U.S. PATENT DOCUMENTS

| | | | |
|---|---|---|---|
| 3,058,869 | 10/1962 | Cohen et al. | 156/250 |
| 3,232,157 | 2/1966 | McMath et al. | 83/76 |
| 3,244,863 | 4/1966 | Paterson | 83/76 |
| 3,276,647 | 10/1966 | Lewis, Jr. et al. | 226/31 |
| 3,510,036 | 5/1970 | Lewis, Jr. et al. | 226/2 |
| 3,728,920 | 4/1973 | Gardner et al. | 83/262 |
| 3,858,052 | 12/1974 | Luska | 250/548 |
| 4,020,406 | 4/1977 | Tokuno et al. | 83/74 |
| 4,044,639 | 8/1977 | Kato | 83/71 |
| 4,147,078 | 4/1979 | Bishop | 83/74 |
| 4,283,185 | 8/1981 | Woolston et al. | 493/35 |
| 4,283,975 | 8/1981 | Knoll | 83/76 |
| 4,287,797 | 9/1981 | Seragnoli | 83/74 |
| 4,289,052 | 9/1981 | Woolston et al. | 271/202 |
| 4,327,615 | 5/1982 | Gerber et al. | 364/475 |

*Primary Examiner*—Gary Chin
*Attorney, Agent, or Firm*—Seidel, Gonda & Goldhammer

[57] ABSTRACT

At a transition between first and second sets of index marks on a web, a target is applied adjacent the initial mark of the second set. The target is sensed and as a result the web is severed transversely at the transition between the sets of marks. A gap is formed in the web. A microcomputer synchronizes a cut-off machine with the second set of marks while the cut-off machine is in the gap whereby operator intervention is eliminated and scrap minimized.

12 Claims, 4 Drawing Figures

STANDARD CUT-TO-MARK CONTROL

STANDARD CUT-TO-MARK CONTROL

CUT-TO-MARK CUT-OFF CONTROL AUTOMATED FOR SPLICE AND ORDER CHANGE

BACKGROUND OF THE INVENTION

This invention is related to the automation of direct drive cut-off knives having cut-to-mark control used in producing sheets of corrugated board from a continuous web of such material. A direct drive knife is a cut-off in which the cyclic speeds of the rotary blades are electronically controlled.

More particularly, this invention is related to the control of such knives to effect automatic synchronization of the knife to registration marks on the web following a web splice or order change.

Direct drive cut-to-mark knives are known in the art of producing corrugated sheets from a cntinuous web of paperboard. The knives cut the web in reference to preprinted indicia corresponding to the length of a single sheet. The knives employ an optical sensor to detect registration marks on the web and means to synchronize the knife to cut the web at or in specific relation to the registration marks in order to produce sheets of the proper length. In these prior art direct-drive knives, the desired length of the sheet is entered into the knife's control logic through a keyboard entry. The logic enables the optical sensor for a short time period known in the art as a "window" to scan a narrow portion of the web for the registration mark. The "window" is intended to prevent the optical sensor from producing a spurious cut signal caused by printed material or a blemish on the web which might otherwise be mistakenly identified by the optical sensor as a registration mark.

Heretofore, intervention by an operator has been necessary when the continuous web has been formed of spliced webs, and also when there has been an order change requiring that the knife cut sheets of a different length. This situation is necessitated because the knife will normally not be in synchronization with the registration marks of the spliced web or the new length associated with an order change, resulting in the registration marks not appearing in the knife logic generated "window". Furthermore, the manual adjustment itself results in the temporary cutting of sheets of improper length, resulting in scrap and in some instances in an exceptionally long sheet which may obstruct the sheet-stacking mechanism. A more detailed discussion of the prior art knives, with reference to the drawings to facilitate understanding, follows in the Detailed Description of the Prior Art.

The present invention removes the necessity for an operator-initiated adjustment following a splice or order change. Moreover, the present invention controls the synchronization of the knife with the registration marks of the spliced web or order change in a manner that minimizes scrap and reduces the possibility of an exceptionally long scrap sheet which may obstruct the stacking mechanism.

SUMMARY OF THE INVENTION

A direct drive cut-to-mark cut-off knife is controlled by a microcomputer to cause synchronization of the knife with the registration marks of a new web of material following a splice or order change. The microcomputer receives web-tracking information from a measuring wheel driven by the moving web. Sensing means upstream of the cut-to-mark knife detects the passage of a "target" such as a strip of metallic tape placed on the web near the splice or order change to identify the splice/order change position. The sensing means, through the microcomputer, sends a "shear" signal to a non-precision knife to sever the web ahead of the target. The microcomputer simultaneously speeds up the leading portion of the web to create a gap in the web.

The web ahead of the gap may be referred to as the "leader" and the web following the gap may be referred to as the "trailer". A second sensing means located downstream of the measuring wheel detects the target on the trailer, allowing the microcomputer to track the target to the cut-off knife. The microcomputer synchronizes the cut-off knife with the target on the trailer while the gap is traversing the knife. The relationship of the target to the registrations marks has been preselected, hence the knives will be in approximate synchronization with the registration marks when the trailer approaches the optical sensor. The microcomputer receives an input from the optical sensor to make a final synchronizing adjustment, thus bringing the knife back in cut-to-mark synchronization after having cut off a sheet bearing the non-precision cut and, at most, one additional sheet of non-conforming length.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PRIOR ART

Figure 1:
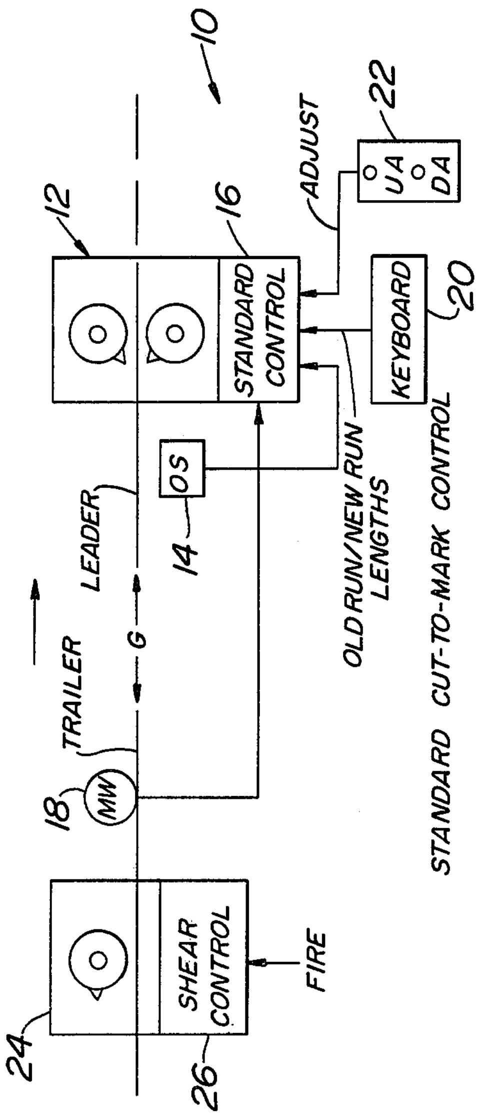
FIG. 1 PRIOR ART
FIG. 1 is a block diagram of a prior art control for a standard cut-to-mark knife.

Referring to the drawings in detail, wherein like numerals indicate like elements, FIG. 1 shows a block diagram of a prior art cut-to-mark knife apparatus designated generally as 10. Central to apparatus 10 is a direct-drive knife 12. Knife 12 is of a type well known to the art for cutting sheets to preselected lengths from a moving web. Knife 12 can be operated in a cut-to-mark mode in which it is controlled by an optical sensor or scanner 14. Registration marks may be imprinted on the web at spaced intervals corresponding to the desired sheet length. Optical sensor 14 is located upstream of knife 12 and directed at the web in such manner that the registration marks may be scanned and detected as they pass. Optical sensor 14, when enabled as discussed below, produces a signal upon sensing a registration mark. The produced signal is received as an input to the logic of control 16 of knife 12. The speed/displacement of the moving web is sensed by a measuring wheel 18 having a pulse generator function. Pulses representing the displacement of the moving web are input to control logic 16. Since the distance of the optical sensor 14 from the cutting plane of knife 12 is known, and the displacement of the web is known from measuring wheel 18, control 16 causes the knife 12 to a cut very close to the precise instant that the registration mark is aligned under the cutting plane. Such knives are known to have a cutting accuracy within ±0.03 inches of the registration mark.

The optical sensor 14 is not continuously enabled to produce a cut signal upon sensing a mark on the web. Instead, a selected cut length corresponding to the desired length of sheets to be cut from the web is entered into control 16 through keyboard 20. Control 16 then enables optical sensor 14 to look for a mark during a short time interval, known in the art as a "window", spanning an expected arrival of a registration mark based on the prior registration mark and the web displacement from measuring wheel 18. Enabling optical sensor 14 only during a "window" inhibits sensor 14 from sensing a false registration mark, such as a blemish or printed material on the web.

Figure 3:
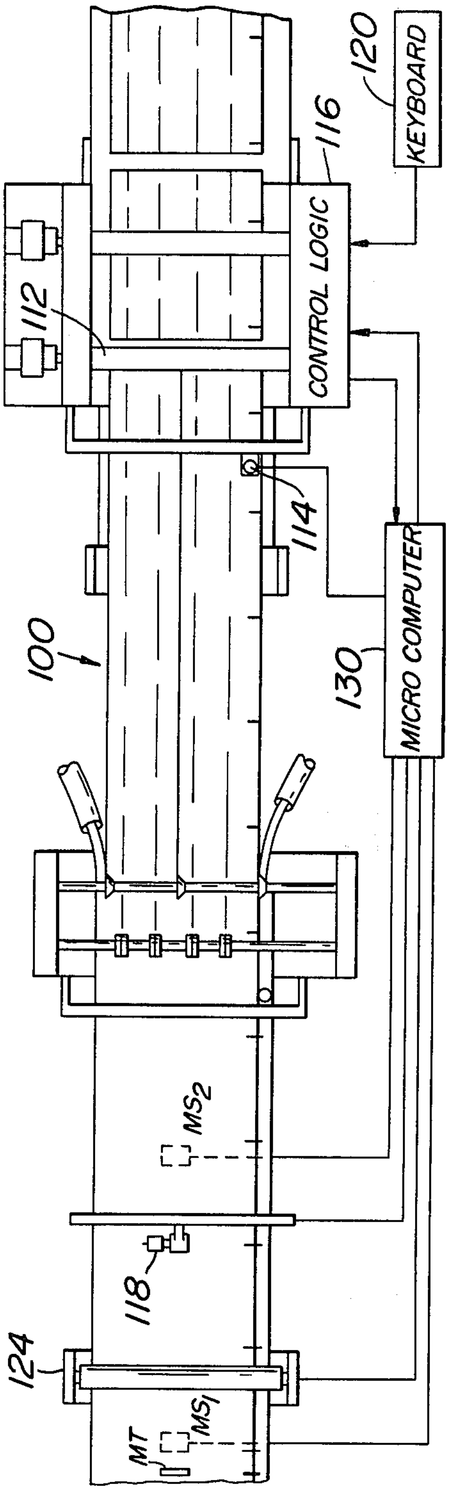
FIG. 3 is a diagrammatic view of an automated control according to the present invention showing the electronic components in block diagram form.

The "window" control feature has become increasingly more important with the utilization of preprinted webs. In contrast to the conventional system wherein material was printed on the individual box blanks after they were severed from the web, in the preprinted process the material is repetitively printed on the continuous web. The registration marks, which may be printed on the web with the printed material, allow the web to be cut into blanks, each containing the preprinted material. Coincident with this feature has come the opportunity to use a portion of the printed material itself as the registration mark. Thus, the registration mark need not be adjacent a side edge of the web as shown in FIG. 3, but rather may be toward the center of the web. Any distinct repetitive portion of the printed web may be used as the registration mark. However, when printed material toward the center of the web is used as a registration mmark, it is more likely that other printed material will pass under the scan of the optical sensor as a frame of the web corresponding to one blank passes the sensor position. If the sensor were continuously enabled, the additional printing would appear to be a registration mark and would create a false signal. The previously discussed "window" enabling signal is intended to prevent creating such a false signal.

However, it will be apparent that the "window" is not foolproof. Since the printing repeats at an interval corresponding to the desired blank length, the optical sensor could become locked onto printed material other than the registration mark. The window will enable the optical sensor for each successive passage of this printed material mistakenly identified as the registration mark. The sheets, while cut to proper length, will be useless because the integrity of the printed image would be destroyed, namely the printing will not be at the desired location on the sheet.

To correct for this synchronization to an erroneous registration mark, a manual adjust control 22 is provided. When activated by the operator, manual adjust control 22 initiates either an upstream or downstream search for the proper registration marks. The operator determines visually which direction, upstream or downstream, the closest true registration mark is located. The operator selects an adjustment in the proper direction by depressing either the upstream (UA) or downstream (DA) adjust button on control 22. In response to depression of the upstream or downstream button, the knife control ignores the mark detected in the window and goes instead into a continuous scan sequence searching for the first mark upstream or downstream of the next sequential window, depending on the button pushed. When a mark is identified, the control generates a new window spaced the desired cut length from the newly identified mark. If the identified mark is repetitive, it will appear in this subsequently generated window, and will cause the control to produce a cut signal. From that point on, the knife will be synchronized to that repetitive mark. In most instances, this mark will be the true registration mark. However, should it be another repetitive extraneous mark, the operator must again initiate an upstream or downstream adjustment until the machine is synchronized to a true registration mark.

The prior art control logic 16 also has a cut-to-length feature. This feature can be manually selected for a web that has no registration marks. Also, the control will automatically switch to cut-to-length mode if no registration mark appears in the window. This could happen at any time that the control loses synchronization with respect to a registration mark, and will normally occur following a splice of web material or an order change in which the web will be cut into blanks of a different length than the previous order. This will be understood more completely after the discussion of the prior art order change which follows. It is to be understood that a splice, which is made by well known means upstream of the cutting apparatus, presents the same problem of synchronization as an order change, even though the sheet length stays the same.

When an order change is made, the new preprinted web (with new printing and registration marks corresponding to the new length desired) is introduced upstream of the cut-off knives. The new length is entered into the knife control 16 through keyboard 20 and stored in control 16 until required. When the printed portion of the new web approaches the rotary shear (non-precision knife) 24 of FIG. 1, the operator activates a switch (not shown in FIG. 1) which sends a "fire" signal to the control 26 of knife 24, causing knife 24 to transversely cut the web across its width. The operator initiated switch also sends a signal to the web drive apparatus (not shown in FIG. 1) downstream of the shear knife 24, which causes the apparatus to speed up for a short period of time causing the web to separate thereby producing a gap G between the downstream portion of the web and the upstream portion of the web. For convenience of reference hereinafter, the downstream portion of the web will be referred to as the "leader" and the upstream portion of the web will be referred to as the "trailer".

Figure 2:
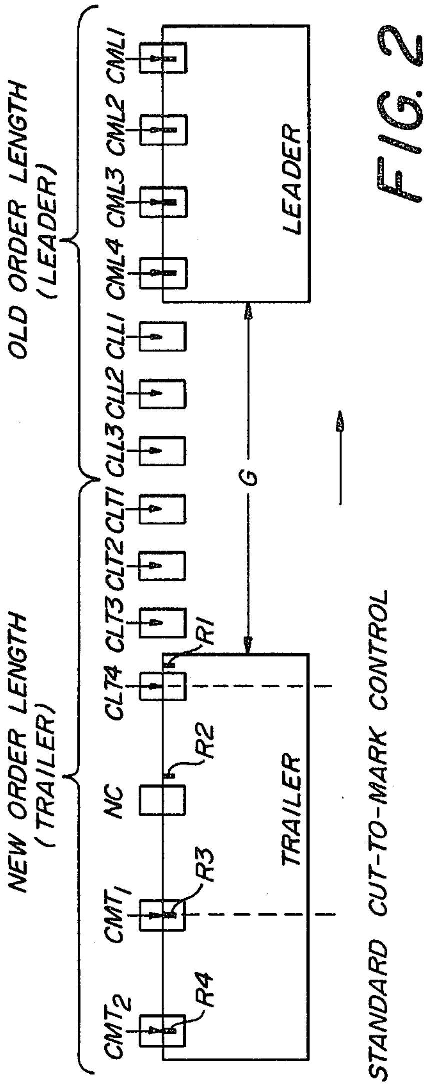
FIG. 2 PRIOR ART
FIG. 2 is a symbolic representation of the operation of a prior art control during a gap-type order change.

Referring now to FIG. 2, it may be seen that the knife control 16 is initially producing windows in synchronization with the registration marks on the leader, causing the knife 12 to operate in the cut-to-mark mode. The windows are spaced apart by a length corresponding to the old blank length. These windows and synchronized registration marks are shown as $CML_1$–$CML_4$ in FIG. 2. $CML_4$ is the last window and registration mark on the trailing edge of the leader. The next occurring window $CLL_1$, which is still spaced from $CML_4$ by the old blank length, occurs in the gap G and therefore no registration mark appears in window $CLL_1$. Knife control 16 therefore causes the knife 12 to cut in its cut-to-length mode as described above. After a selected number of cut-to-length sequences, shown as $CLL_1$–$CLL_3$, the logic of knife control 16 senses the gap G and switches to producing windows spaced apart by the new order length stored in control 16. This change occurs in the gap, so there will be no registration mark in the window. Knife control 16 therefore remains in the cut-to-length mode at a new order length shown as $CLT_1$-$CLT_4$.

$CLT_4$ is the first cut on the trailer. This cuts off a short piece on the leading edge of the trailer which disposes of the ragged severing cut produced by the rotary shear 24. It would be mere coincidence or highly improbable for the window associated with $CLT_4$ to occur at a registration mark $R_1$ on the trailer. Hence, the knife control 16 will in most instances continue to operate in the cut-to-length mode. An upstream or downstream adjustment must be initiated by the operator to bring the knife control into synchronization with the registration marks on the trailer. This adjustment is shown in FIG. 2 as occurring at the first opportunity, that is, immediately after $CLT_4$. It is shown this way in FIG. 1 only for abbreviation of the drawings. In reality, several sheets may be cut as scrap in the cut-to-length mode before the first blanks cleared the cut-off apparatus and were subject to a visual inspection by the operator to determine if an upstream/downstream adjustment is required.

In the example shown, since the closest registration mark $R_1$ to the cut produced in the cut-to-length mode is just slightly downstream of the cut, a downstream adjustment is selected. When the operator depresses the downstream adjust button, the knife control logic 16 prevents the knife from cutting at the window NC, and simultaneously activates the optical sensor 14 into continuous scan. Marks appearing to be registration marks to optical sensor 14 are input to knife control logic 16. Knife control logic 16 identifies and locks on the last mark detected by optical sensor 14 prior to the window NC. This mark is shown as $R_2$ in FIG. 2. Control logic 16 then generates a new window $CMT_1$ corresponding to the new order length spaced from $R_2$. If the mark is recurring on the web, it will continue to appear in the subsequent windows $CMT_1$-$CMT_2$ etc., and the knife reverts to cut-to-mark mode. If the marks $R_1$-$R_4$ are true registration marks, the knife is synchronized to the trailer for the new order.

From the above, it can be seen that significant operator attention is required for an order change. Moreover, a number of sheets on the trailer may be scrap before the knife control is brought into synchronization with the new preprinted web.

DETAILED DESCRIPTION OF THE INVENTION

Referring now to FIG. 3, a knife apparatus according to the present invention is designated generally as 100. Apparatus 100 includes many elements common to the prior art knife control. Thus, there is shown a direct drive cut-off knife 112, optical sensor 114, knife control logic 116, measuring wheel 118, and keyboard 120.

A microcomputer 130 is provided to control the knife 112 through control logic 116 during an order change or splice. Microcomputer 130 receives input information from measuring wheel 118, optical sensor 114, knife control logic 116, and two magnetic sensors $MS_1$ and $MS_2$ in a manner to be explained more fully below. Microcomputer 130 uses the information to activate the non-precision rotary shear 124 and the direct drive knife 112.

The cooperation of the above elements will again be described with regard to the transition of a splice or an order change in which the new order requires blanks of a length different from the old order. In addition, it will be assumed for purposes of illustration that a splice of the web coincides with the order change. The registration marks on the trailer will not be in synchronization with the windows of the knife control 116 due to each of those conditions.

In a splice, the apparatus upstream of the knives splices a new web roll to the old web roll in a well known manner. However, in contrast to the prior art, the operator also attaches a target such as a strip of metallic tape to the new web at the first registration mark upstream of the splice. This metallic tape will be detected by the magnetic sensors $MS_1$ and $MS_2$ which are a known distance apart. It should be understood, however, that other forms of target on the trailer web could be used. Metallic tape and metal sensors merely represent the preferred means in that they are believed to be the most effective and easiest to employ. Hence, the general concept should be thought of as placing a target on the new web at a registration mark upstream of the splice, and/or where an order change occurs and detecting that target by appropriate sensing means.

The blank length corresponding to the new order is entered by the operator into knife cut-off logic 116 through keyboard 120 as previously described. When the metallic tape MT passes in register with magnetic sensor $MS_1$, a signal is produced and inputted to microcomputer 130. Microcomputer 130 initiates a fire signal to rotary shear 124 which causes shear 124 to sever the web ahead of the metallic tape. The web downstream of the cut is caused to accelerate by increasing the processing speed in the manner described above in discussing the prior art. This causes a gap to form in the web. The downstream web portion may again be referred to as the leader, and the upstream web portion as the trailer.

While the gap passes measuring wheel 118, measuring wheel 118 is no longer driven by the web. When the trailer arrives under measuring wheel 118, the displacement input from wheel 118 to microcomputer 130 represents the speed at which the trailer is moving toward the cutting knives 112. When the metallic tape MT, which is on the trailer at the first registration mark passes the second magnetic sensor $MS_2$, a signal is sent to microcomputer 130 which thereafter tracks the metallic tape from the displacement information received from measuring wheel 118.

Figure 4:
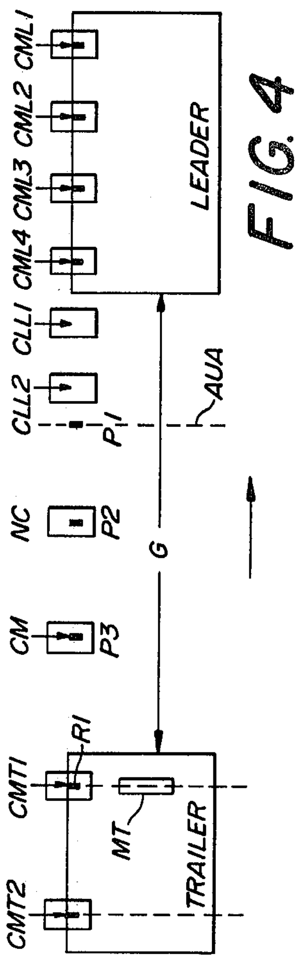
FIG. 4 is a symbolic representation of the operation of the present invention during a gap-type order change.

Referring now to FIG. 4, it can be seen how microcomputer 130 automatically adjusts for the order change and brings the trailer into synchronization with the windows corresponding to the new order blank length. As the leader traverses knife 112, in the cut-to-mark mode, the registration marks are in synchronization with the windows corresponding to the length of the old order, designated herein as $CML_1$-$CML_4$. $CML_4$ is the last registration mark on the leader. The next window $CLL_1$ is spaced the same distance from $CML_4$ corresponding to the old order length, but will occur in the gap whereby no registration mark is present. This causes knife control 116 to revert to cut-to-length mode as described previously.

A selected number of cut-to-length windows may occur before the metallic tape is detected by sensor $MS_2$. However, after detection of the metallic tape by sensor $MS_2$, microcomputer 130 begins to generate a train of pulses $P_1$-$P_3$ in synchronization with the extrapolated position of metallic tape MT and therefore in synchronization with the first registration mark $R_1$ in FIG. 4. The pulses $P_1$-$P_3$ are spaced apart by a time interval correlated to the new order blank length entered through keyboard 122. Pulses $P_1$–$P_3$ enter knife logic 116 and appear to the logic as pulses generated by optical sensor 114 in response to true registration marks. However, when the pulse $P_1$ is received by knife control 116 after detection of the metallic tape by sensor MS2, it is treated by the control as an upstream or downstream adjust signal, causing the knife control 116 to make an upstream or downstream adjustment. This is indicated by the dotted line designated AUA in FIG. 4. As explained previously, during an upstream or downstream adjustment, the knife control 116 does not cut on the next received registration mark (herein $P_2$). Instead, it awaits the first mark upstream or downstream of the window as the case may be, and generates a new window based on the location of that first mark. When a mark is sensed in the new window, knife control 116 operates the cutting knives to effect a cut.

Preferably, the window extends a minimum of 2 inches upstream and 2 inches downstream of a registration mark. The registration marks preferably have a width of 0.25 inch and a length of 6 inches.

As shown in FIG. 4, an upstream adjustment is initiated coinciding with pulse $P_1$ at AUA. In response to the next received pulse $P_2$ (indicated as NC) the control 116 will not operate the cut-off knives to effect a cut. The knife control instead generates a new window based on the pulse $P_2$. The microcomputer 130 now sequences knife control 116 to apply the new order cut length input which had been entered via the keyboard. The the next generated window CM will then be in synchronization with the pulse $P_3$ and a cut will occur, that is, control 116 will operate the knives to make a cut. It will be remembered that the pulses $P_1$–$P_3$ were generated by microcomputer 130 by extrapolating the position of the metallic tape MT. Thus, the cut which occurs at window CM occurs while the cut-off machine is in the gap so that no web is cut and no scrap produced. When the trailer arives under the knife 112, however, the first registration mark $R_1$ will be in synchronization with the first window appearing at $CMT_1$ and the control 116 will operate the knives to cut the trailer at the registration mark. Thereafter, the trailer registration marks and windows remain in synchronization as the knives are operated by control 116 to cut the trailer in the cut-to-mark mode.

It can be seen from the above that the automatic control provided by microcomputer 130, the metallic tape MT and magnetic sensors $MS_1$ and $MS_2$ provide a completely automated order change without the necessity of operator intervention at the cutting knife to make an upstream or downstream adjustment, and result in elimination of the scrap which would otherwise occur in the prior art order change since adjustment of the knives is now accomplished in the gap. As can be seen from FIG. 4, when a splice or order change occurs in connection with the present invention, only a small portion of trailer scrap need be cut ahead of registration mark $R_1$.

The present invention may be embodied in other specific forms without departing from the spirit or essential attributes thereof and, accordingly, reference should be made to the appended claims, rather than to the foregoing specification, as indicating the scope of the invention.

We claim:

1. A method for automatic control of a cut-off machine at the transition of a splice in a web comprising:

(a) cutting a moving web at index marks thereon by a cut-off machine;

(b) applying a target capable of being sensed to an idle web adjacent an initial index mark thereon, splicing the idle web to the moving web;

(c) sensing said target when it appears at a first location upstream from the cut-off machine and generating a signal; thereafter, severing the web transversely in response to the signal and creating a gap between leading and trailing portions of the web;

(d) sensing said target when it appears at a second location upstream of the cut-off machine; thereafter, sensing displacement of the trailing portion of the web and generating a series of signals representative of extrapolated positions of the target upstream of said cut-off machine based on sensing the target at the second location and sensing displacement of the trailing position of the web;

(e) synchronizing the cut-off machine with the index marks on the trailing portion of the web while the cut-off machine is in said gap in response to said series of signals;

(f) whereby said cut-off machine cuts said trailing portion of the web at said index marks beginning with said initial index mark and operator intervention to make an upstream or downstream adjustment is eliminated.

2. A method in accordance with claim 1 including using a target which can be sensed by a magnetic detector.

3. A method in accordance with claim 1 including generating said signals at step (d) in the form of pulses.

4. A method for automatic control of a cut-off machine at the transition of an order change in a web comprising:

(a) cutting a moving web at index marks thereon by a cut-off machine;

(b) applying a target capable of being sensed to the web adjacent an initial index mark thereon where the order change occurs;

(c) sensing said target when it appears at a first location upstream from the cut-off machine and generating a signal; thereafter severing the web transversely in response to the signal and creating a gap between leading and trailing portions of the web;

(d) sensing said target when it appears at a second location upstream of the cut-off machine; thereafter sensing displacement of the trailing portion of th web and generating a series of signals representative of extrapolated positions of the target upstream of said cut-off machine based on sensing the target at the second location and sensing displacement of the trailing portion of the web;

(e) synchronizing the cut-off machine with the index marks on the trailing portion of the web while the cut-off machine is in said gap in response to said series of signals;

(f) whereby said cut-off machine cuts said trailing portion of the web at said index marks beginning with said initial index mark and operator intervention to make an upstream or downstream adjustment is eliminated.

5. A method in accordance with claim 4 including using a target which can be sensed by a magnetic detector.

6. A method in accordance with claim 4 including generating said signals at step (d) in the form of pulses.

7. A method for automatic control of a cut-off machine at a transition between two sets of index marks on a web comprising:

(a) cutting a moving web at the first set of index marks thereon by a cut-off machine;
(b) applying a target capable of being sensed to the web adjacent an initial index mark thereon for the second set of index marks;
(c) severing the web transversely at the transition and creating a gap between a leader and a trailer;
(d) sensing the target on the trailer at a location upstream of the cut-off machine; thereafter, sensing displacement of the trailer and generating a series of pulses representative of extrapolated positions of said target upstream of said cut-off machine based on sensing the target at said second location and on sensing displacement of the trailer; and
(e) synchronizing the cut-off machine with the second set of index marks on the trailer while the cut-off machine is in said gap in response to said series of pulses;
(f) whereby said cut-off machine cuts said trailing portion of the web at said second set of index marks beginning with said initial index mark and operator intervention to make an upstream or downstream adjustment at the transition is eliminated.

8. In operation of a paperboard corrugator having a shear capable of severing a moving web into leading and trailing portions and a cut-off for cutting the web into sheets in accordance with preprinted index marks thereon separated by a transition, a method for automatic synchronization of the cut-off with preprinted index marks on the trailing portion comprising the steps of:

(a) applying a target to the web at or in juxtaposition with a preselected index mark near the transition;
(b) sensing said target and generating a shear signal based thereon;
(c) severing the web in response to said shear signal into leading and trailing portions so that said target is on the trailing portion;
(d) accelerating the leading portion of the web to create a gap between the leading portion and the trailing portion;
(e) sensing the displacement of the trailing portion and generating and transmitting corresponding displacement pulses to a microcomputer;
(f) sensing the target upstream from the cut-off and generating and transmitting a target signal to the microcomputer;
(g) predicting the position of the target upstream of the cut-off by the microcomputer based on the displacement pulses and the target signal and generating a series of signals representative of predicted target positions while the cut-off is in the gap, and
(h) using said series of signals to synchronize the cut-off in accordance with the index marks on the trailing portion while the cut-off is in the gap so that the cut-off immediately cuts sheets on the index marks from the trailing portion when said trailing portion enters the cut-off.

9. A method in accordance with claim 8 including using a target which can be sensed by a magnetic detector.

10. A method in accordance with claim 8 including generating the signals in step (g) in the form of pulses.

11. Apparatus for providing automated control for a cut-to-mark cut-off knife comprising:

(a) first sensing means for detecting the passage of a target located on the web at a known position relative to a registration mark on the web;
(b) means operatively connected to said first sensing means for severing the web ahead of the target into a leader portion and trailer portion, whereby the target is on the trailer portion;
(c) means for producing a gap between said leader and trailer portions;
(d) means for producing a signal indicative of displacement of the trailer portion;
(e) second sensing means downstream from said first sensing means for detecting the target and generating a signal representative thereof; and
(f) a cut-off knife having logic means for receiving as input information said signal indicative of displacement of the trailer portion and said signal representative of detection of said target by said second sensing means, said logic means being adapted to utilize said information to project the time of arrival of said registration mark at a cutting plane of said knife, and said logic means being adapted to bring said knife into cut-to-mark synchronization with said registration mark while said knife is in said gap.

12. Method of operating a cut-off machine in a cut-to-mark mode so as to cut a moving web which is divisible into leading and trailing portions at index marks thereon, comprising:

(a) applying a target to the web proximate an index mark thereon;
(b) severing the web transversely proximate the target, and creating a gap between leading and trailing portions of the web;
(c) sensing index marks on the leading portion of the web, and operating the cut-off machine in the cut-to-mark mode so as to cut the leading portion at the sensed index marks;
(d) sensing the target at a station upstream of the cut-off machine, and generating a series of signals when the cut-off machine is in the gap, which signals simulate sensing of index marks on the trailing portion of the web;
(e) operating the cut-off machine in the cut-to-mark mode when the cut-off machine is in the gap in response to said series of signals; and
(f) sensing index marks on the trailing portion of the web beginning with the index mark proximate said target, and operating the cut-off machine in the cut-to-mark mode so as to cut the trailing portion at said sensed index marks thereon;
(g) whereby operator intervention to make an upstream or downstream adjustment as the trailing portion of the web traverses the cut-off machine is eliminated.

* * * * *